United States Patent
Larsen (10) Patent No.: US 9,931,972 B2
(45) Date of Patent: Apr. 3, 2018

(54) CARRIER FOR BACKING A TOWED DINGHY

(71) Applicant: Richard R. Larsen, Cookeville, TN (US)

(72) Inventor: Richard R. Larsen, Cookeville, TN (US)

(*) Notice: Subject to any disclaimer, the term of this patent is extended or adjusted under 35 U.S.C. 154(b) by 2 days.

(21) Appl. No.: 14/804,436

(22) Filed: Jul. 21, 2015

(65) Prior Publication Data
US 2017/0021753 A1   Jan. 26, 2017

(51) Int. Cl.
*B60P 3/12*   (2006.01)

(52) U.S. Cl.
CPC .................... *B60P 3/125* (2013.01)

(58) Field of Classification Search
CPC .. B60P 3/127; B60P 3/12; B60P 3/125; B60P 3/1033; B60P 3/075; B66F 7/246; B66F 7/0625; B66F 7/243; B66F 7/24; B60B 15/00; B60D 1/14; B60D 1/54; B62B 5/0083; B62B 5/0086; B62B 5/0093; B62B 29/002
USPC ....... 280/DIG. 14, 402, 24, 845, 761, 28.17, 280/28.18, 13, 19.1, 23.1, 28.5, 32, 8, 280/79.4, 80.1, DIG. 9, DIG. 11; 16/42 R; 414/426, 430, 428; 188/5, 6, 7, 188/8
See application file for complete search history.

(56) References Cited

U.S. PATENT DOCUMENTS

| | | | | |
|---|---|---|---|---|
| 97,009 A | * | 11/1869 | Wheeler | B66F 7/246 280/80.1 |
| 329,145 A | * | 10/1885 | Dexter | B62B 13/18 280/8 |
| 1,419,067 A | * | 6/1922 | McCarthy | B66F 7/246 254/84 |
| 2,011,507 A | * | 8/1935 | Upchurch | B62C 1/04 280/8 |
| 2,259,399 A | * | 10/1941 | Sutter | B66F 7/246 414/430 |
| 2,608,312 A | * | 8/1952 | Day | B66F 7/246 414/430 |

(Continued)

FOREIGN PATENT DOCUMENTS

| | | | |
|---|---|---|---|
| DE | 640189 | * | 6/1953 |
| DE | 2242886 | | 3/1974 |

(Continued)

*Primary Examiner* — Anne Marie M Boehler
(74) *Attorney, Agent, or Firm* — Knox Patents; Kenneth C. Spafford (57) ABSTRACT

A carrier for reverse maneuvering a flat-towed dinghy attached to a towing vehicle. The carrier includes a platform, two caster wheels, and a friction slide plate. The friction slide plate is configured to present greater resistance to horizontal movement than the two caster wheels. When the front tires of a flat-towed dinghy are loaded onto a pair of carriers, the dinghy is maneuvered in reverse without the dinghy front wheels reverting to the maximum turn that is normally caused by the dinghy front wheel steering caster angle. The dinghy rolls onto the carrier when the flat-towed dinghy is moved in the backward direction. A chock or stop device prevents the front tire from rolling off the platform when the flat-towed dinghy is moving in the backward direction. The dinghy rolls off the carrier when the dinghy is moved in the forward direction.

13 Claims, 5 Drawing Sheets

(56) References Cited

U.S. PATENT DOCUMENTS

| | | | | |
|---|---|---|---|---|
| 2,610,750 A | * | 9/1952 | Hulbert | B66F 7/246 280/33.998 |
| 3,087,266 A | * | 4/1963 | McEvoy | B60R 19/54 280/13 |
| 3,224,611 A | * | 12/1965 | Smuck | B66F 7/246 414/430 |
| 3,897,959 A | * | 8/1975 | Haffner | B60P 3/062 280/79.11 |
| 4,824,135 A | | 4/1989 | McGregor | |
| 4,993,910 A | | 2/1991 | Rigg | |
| 5,039,123 A | * | 8/1991 | Smeitink | B66F 7/246 280/37 |
| 5,221,100 A | | 6/1993 | McNutt | |
| 5,244,226 A | | 9/1993 | Bergh | |
| 5,249,907 A | * | 10/1993 | Poten | B66F 7/246 280/43.11 |
| 5,984,616 A | | 11/1999 | Youmans et al. | |
| 6,036,217 A | | 3/2000 | Burkhart, Sr. et al. | |
| 6,273,447 B1 | | 8/2001 | Vande Berg | |
| 6,626,449 B2 | | 9/2003 | Hazen | |
| 6,712,380 B1 | | 3/2004 | Edens | |
| 6,820,887 B1 | | 11/2004 | Riggle | |
| 6,860,496 B2 | * | 3/2005 | Novak | B62B 5/049 211/20 |
| 7,154,385 B2 | | 12/2006 | Lee et al. | |
| 7,284,942 B1 | * | 10/2007 | Allen | B62H 3/08 280/79.11 |
| 7,503,577 B2 | | 3/2009 | McEvoy | |
| D600,873 S | * | 9/2009 | Banasik | D34/23 |
| 7,631,881 B2 | | 12/2009 | Broemeling | |
| 8,360,457 B2 | | 1/2013 | Timmons, Jr. | |
| 8,511,702 B1 | | 8/2013 | Howell | |
| 8,882,434 B2 | * | 11/2014 | LaBruyere | B62B 5/0083 280/79.4 |
| 8,973,716 B2 | * | 3/2015 | McKay | B60T 1/04 188/1.12 |
| 9,045,000 B1 | * | 6/2015 | Giagni, Sr. | B66F 7/246 |
| 2003/0137126 A1 | | 7/2003 | Reuter et al. | |
| 2007/0194557 A1 | | 8/2007 | Caporali et al. | |
| 2008/0100015 A1 | * | 5/2008 | Symiczek | B60S 13/00 280/79.4 |
| 2012/0215393 A1 | | 8/2012 | Schiedegger | |
| 2014/0203532 A1 | | 7/2014 | Elbers et al. | |
| 2014/0333046 A1 | | 11/2014 | Olsen | |
| 2015/0246798 A1 | * | 9/2015 | Guzman Restori | B66F 7/246 14/72.5 |

FOREIGN PATENT DOCUMENTS

| | | | | |
|---|---|---|---|---|
| FR | 2250323 | * | 5/1975 | B60D 1/00 |
| FR | 2948079 | | 1/2011 | |
| GB | 923512 | * | 4/1963 | |

* cited by examiner

CARRIER FOR BACKING A TOWED DINGHY

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND

1. Field of Invention

This disclosure pertains to towing aids for flat-towed vehicles. More particularly, this disclosure pertains to carriers that are placed under the front wheels of a flat-towed vehicle when the towing and towed vehicle are being maneuvered together in reverse.

2. Description of the Related Art

In the field of powered recreational vehicles ("RVs"), it is common to tow a small second vehicle for local transportation when a destination is reached and the RV is parked and connected to services. The towed vehicle is sometimes referred to as a "toad," or more commonly as a "dinghy."

The most common method of towing a dinghy is referred to as "four-down" or "flat-towing," where all the wheels of the dinghy remain on the road during towing. The advantages of flat-towing include a quick, easy connection and disconnection of the dinghy from the RV; no additional vehicles such as a flatbed trailer or tow dolly needing to be stored when the dinghy is not being towed; and the special tow bar required for flat-towing remaining attached to one of the vehicles and simply folded and locked when not in use.

However, there is one significant disadvantage to flat-towing: the RV and dinghy cannot be moved in reverse when they are connected, i.e., they cannot be "backed up." Attempting to back up a flat-towed dinghy is likely to cause significant stresses and permanent damage to both the tow hitch and dinghy steering system. The caster angle and steering axis inclination (SAI) built into the dinghy's steering system, which normally stabilizes steering when the dinghy is driven forward as a conventional vehicle, will work to turn the dinghy's front wheels the wrong way when the dinghy is being backed up with the RV. Even the slightest tail swing by the tow vehicle against the front of the dinghy will destabilize the dinghy's steering system and cause the dinghy's wheels to rotate violently against the steering mechanical stops, resulting in severe stresses. Moreover, once the dinghy's front tires are fully turned they are essentially perpendicular to the direction of travel, and continuing to reverse the dinghy will push the tires sideways, causing serious damage to the dinghy.

When the frame of the dinghy is pushed in reverse from the front end by the tow hitch, the caster angle in the steering attempts to swing the front wheels around to face rearward in a manner similar to the front caster wheels on a shopping cart. The slightest lateral force will begin the steering rotation, and rotation will proceed rapidly as the steering angle increases. When the steering system hits the left or right rotational stop, it does so with a heavy impact, even at very low speed, putting severe load on the dinghy's steering system and on the tow hitch and RV frame.

This limitation of being unable to back up a flat-towed dinghy puts the RV driver at a strong disadvantage when entering an unfamiliar area such as a store parking lot or side road. The driver must proceed with extreme caution and try to simultaneously search out an egress route while also studying the entrance route. If the RV driver is unable to exit a location by driving forward, the only option is to stop the RV in a spot that affords the least blockage of traffic, lock the brakes on the RV, disconnect the dinghy, and drive the dinghy to a safe parking area. The driver must then return to the RV and reposition it toward the exit, then return to the dinghy, maneuver it back to the RV, reconnect the tow hitch, and exit. In an area with high traffic, such as a shopping mall or busy street, this procedure becomes a serious and dangerous situation with blocked traffic and impatient drivers trying to dodge the blockage. On a grade, the disconnect and reconnect of the dinghy to the RV can become difficult or even hazardous, and may require two people.

Prior art such as U.S. Pat. No. 5,560,628 by Horn offers one solution to the problem of backing a flat-towed dinghy by lifting the front end of the dinghy completely off the ground, such that the RV carries the dinghy's weight in a manner similar to a tow truck. Horn discloses a lift using a motorized screw and hitch frame that attaches to a hitch and coupling at the front of the towed vehicle, and elevates the frame of the towed vehicle until the front tires clear the ground. Similarly, U.S. Pat. No. 7,318,698 by Gipson teaches a rear-extending linkage and power system to lift the front wheels of the towed vehicle clear of the ground. While these systems achieve their objective, they require extensive modification to the RV frame to withstand the dinghy's front weight, which can be 2000 to 3000 pounds. The lift devices are heavy, complex, and expensive. Also, most dinghies are not constructed for single-point lifting and towing on the frame, and may require extensive modification.

There is also a great deal of prior art, including dollies, carriages, and tire buoys, that carries the weight of a wheel that is still attached to a vehicle, such as the devices taught in U.S. Pat. No. 834,146 by Lewis and U.S. Pat. No. 863,122 by Webber. Other wheel carriers, such as those taught in U.S. Pat. No. 2,226,521 by McNamara and U.S. Pat. No. 3,224,611 by Smuck, are intended to allow a vehicle with a flat tire to be driven to a service location without having to change the flat tire. However, these devices, and related prior art, are not used on modern dinghies attached to RVs because the devices do not address the peculiar loading and forces exerted on a dinghy that is coupled to an RV. Specifically, the prior art wheel carriers are not designed to overcome the steering caster and steering axis inclination (SAI) forces that are created by the lateral forces that occur when a towing vehicle pushes a towed vehicle in reverse from a tow hitch attached to the front of the towed vehicle.

Accordingly, it is an object of the present disclosure to provide a means of backing up an RV with a flat-towed dinghy attached.

It is another object of the present disclosure to provide a means for backing up a flat-towed dinghy in a familiar manner by which the dinghy behaves and steers like a conventional trailer.

It is another object of the present disclosure to provide a flat-towed dinghy backup device that is inexpensive, simple, and easy to carry and store.

It is another object of the present disclosure to provide a flat-towed dinghy backup device that does not require modifications or attachments to either the RV or dinghy.

It is another object of the present disclosure to provide a wheel carrier that disengages the front wheels of a flat-towed dinghy from the road surface while backing up the dinghy.

It is another object of the present disclosure to provide a dinghy backup system that can be easily stowed in either the dinghy or RV.

It is another object of the present disclosure to provide a dinghy backup carrier that passively locks to the road surface as the dinghy backs up onto the carrier and as the dinghy drives off the carrier.

It is another object of the present disclosure to provide a dinghy wheel carrier that overcomes the turning force from the dinghy front wheels' positive caster angle and SAI when the dinghy is being backed up.

It is another object of the present disclosure to provide a dinghy wheel carrier that does not require the dinghy to lock its brakes while the carrier is being used.

BRIEF SUMMARY

According to one embodiment of the present invention, a carrier for the front wheel of a dinghy is provided. Two slide carriers are used, with each placed under a front wheel of a dinghy that is to be backed up while still hitched to a towing vehicle, such as a recreational vehicle (RV). The carriers overcome the caster angle turning forces exerted on the front wheels when the dinghy is being pushed in reverse from the tow hitch attached to the front of the dinghy. In this way an RV is able to effectively back up a flat-towed dinghy directly, rather than disconnecting the dinghy from the RV and backing it up separately.

Each carrier includes a platform with a leading edge and a trailing edge, a set of wheels at the leading edge, and a drag mechanism at the trailing edge. The leading edge of the carrier is the end that is furthest away from the front end of the dinghy and the trailing edge of the carrier is that edge that is closest to the RV. In other words, the leading and trailing edges are in reference to the direction of the carrier as it moves when the dinghy is backing up.

The platform is configured to support one of the front tires of the dinghy. In various embodiments the platform has a chock or tire stop to secure the tire in position on the platform and a non-skid surface. The set of wheels allow the leading edge of the platform to easily move laterally and in the backing up direction. In one embodiment the set of wheels are rolling casters, that is, they are swiveling wheels.

The drag mechanism proximate the trailing edge presents a greater coefficient of friction to the ground or roadbed than that of the set of wheels at the leading edge. In this way the trailing edge of the platform offers greater resistance to movement than the set of wheels, thereby overcoming the caster and steering axis inclination effects of the front wheels of the dinghy and ensuring that the dinghy backs up as desired. In one embodiment the drag mechanism includes rollers with a drag clutch mechanism. In another embodiment the drag mechanism is one or more plates that contact the road surface. One type of such plate is a flat ceramic plate that extends from one side of the platform to the other on the bottom of the platform.

BRIEF DESCRIPTION OF THE SEVERAL VIEWS OF THE DRAWINGS

The above-mentioned features will become more clearly understood from the following detailed description read together with the drawings in which.

DETAILED DESCRIPTION

Apparatus for a carrier 100 that overcomes the caster and steering axis inclination turning forces of a towed vehicle moving backwards is disclosed. The carrier 100 is generally indicated as 100, with specific embodiments and variations shown in the figures and described below having an alphabetic suffix, for example, 100-A, 100-B. Some elements use hash marks to indicate a second embodiment, for example, the platform 302, 302'.

Figure 1:
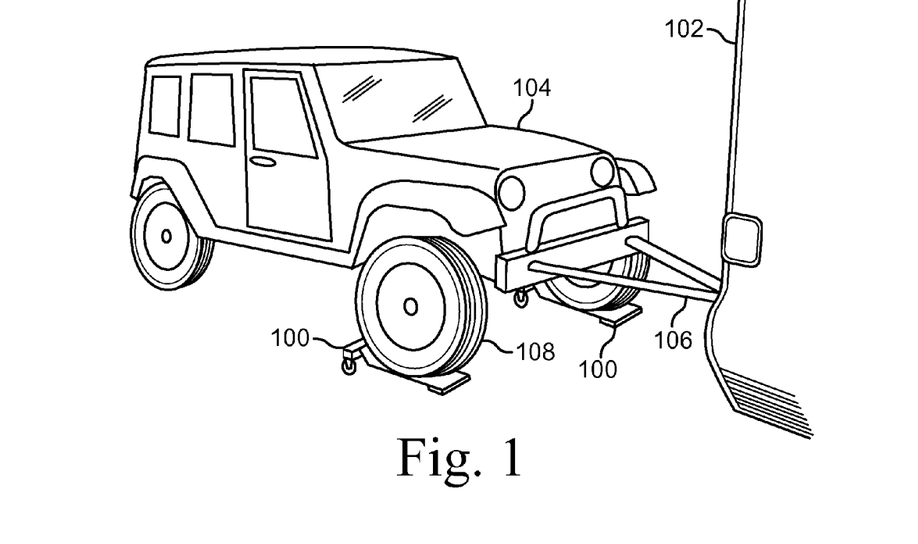
FIG. 1 is a perspective view of a pair of carriers underneath the front wheels of a dinghy that is attached to a towing vehicle with a tow hitch.

FIG. 1 illustrates a perspective view of a pair of carriers 100 underneath the front tires 108 of a dinghy 104 that is attached to a towing vehicle 102 with a tow bar 106. The tow vehicle 102 has a hitch to which a tow bar 106 is attached. The other end of the tow bar 106 is attached to the front of the towed vehicle, or dinghy, 104. A pair of carriers 100 are positioned behind the front tires 108 of the dinghy 104 before the dinghy 104 is to be backed up. The dinghy 104 is then backed up until the front tires 108 rest upon the carriers 100. The carriers 100 are removed from the dinghy 104 when the dinghy 104 is not to be backed up by pulling the dinghy 104 forward.

Figure 2:
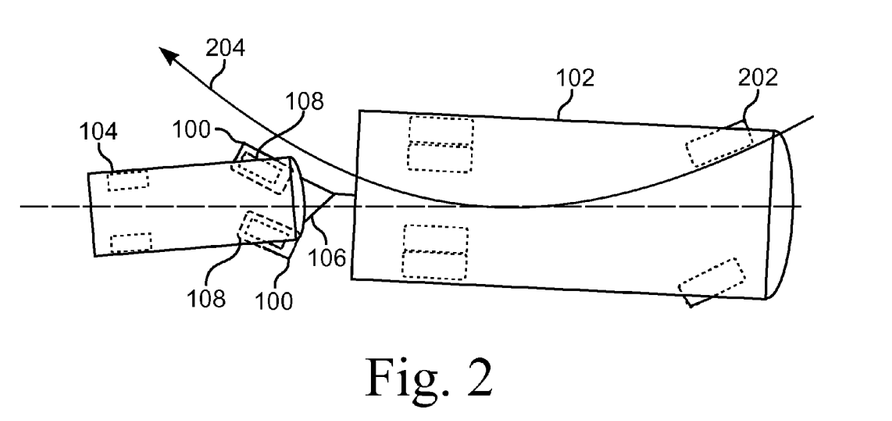
FIG. 2 is a top view of a pair of carriers under the front wheels of a dinghy while the dingy and a towing vehicle are maneuvering in reverse.

FIG. 2 illustrates a top view of a pair of carriers 100 under the front tires 108 of a dinghy 104 while the dingy 104 and a towing vehicle 102 are maneuvering in a reverse direction 204. The towing vehicle 102, such as a recreational vehicle (RV), has its front wheels 202 turned to back up in the reverse direction 204. The movement of the RV 102 in reverse causes the dinghy 104 to back up with the front wheels 108 turning to align themselves with the reverse direction 204. In this way the dinghy 104 moves in reverse without placing any undue strain on its steering mechanism.

Figure 3:
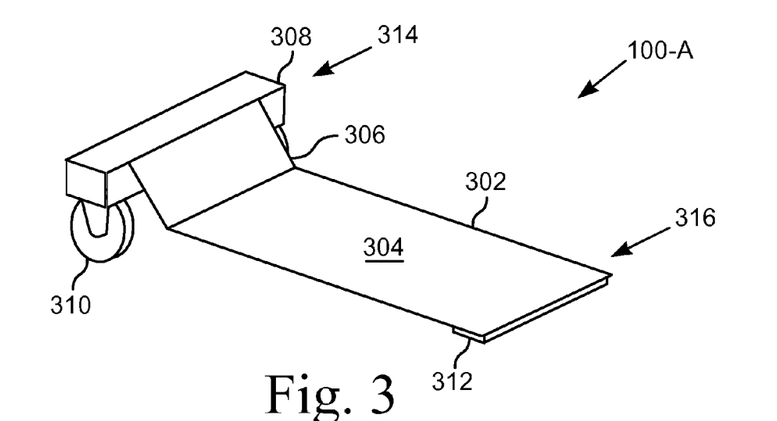
FIG. 3 is a perspective view of one embodiment of a slide carrier.

FIG. 3 illustrates a perspective view of one embodiment of a slide carrier 100-A. The carrier 100-A includes a platform 302, a set of wheels 310, and a drag mechanism 312. The carrier 100-A has a leading end 314 and a trailing end 316 that are defined in reference to the direction 204 of travel of the carrier 100 when the dinghy 104 is being backed up. The leading end or edge 314 of the carrier 100 is the end that is furthest away from the front end of the dinghy 104 and the trailing end or edge 316 of the carrier 100 is that end that is closest to the RV 102.

The platform 302 is configured to receive and support the tire 108 of the dinghy 104. In the illustrated embodiment the platform includes a support surface 304 and a chock 306. The tire 108 rests upon the upper side of the support surface 304. A back portion of the tire 108 relative to the dinghy 104 rests against the chock 306, which arrests movement of the tire 108 toward the leading edge 314 as the dinghy 104 is pushed in the backwards direction 204.

The set of wheels 310 are positioned proximate the leading edge 314 of the carrier 100-A. The pair of wheels 310 are rolling casters attached to a support beam 308 that extends across the leading end 314 of the carrier 100-A. The platform 302 attaches to the beam 308.

The drag mechanism 312 is positioned proximate the trailing edge 316 of the carrier 100-A. The drag mechanism 312 has a greater coefficient of friction between the carrier 100 and the ground 604 than the set of wheels 310 at the leading edge 314. The drag induced by the drag mechanism 312 relative to the drag induced by the wheels 312 at the leading end 314 ensures that the wheels 108 of the dinghy 104 properly track the movement of the dinghy 108.

In the illustrated embodiment the drag mechanism 312 is a ceramic plate 312 attached under the platform 302 extending across the width of the carrier 100-A at the trailing end 316. In another embodiment multiple ceramic plates 312 are attached to the bottom of the platform 302. In yet another embodiment the drag mechanism 312 includes rollers with a drag clutch mechanism that adds rolling resistance at the trailing end 316.

Figure 4:
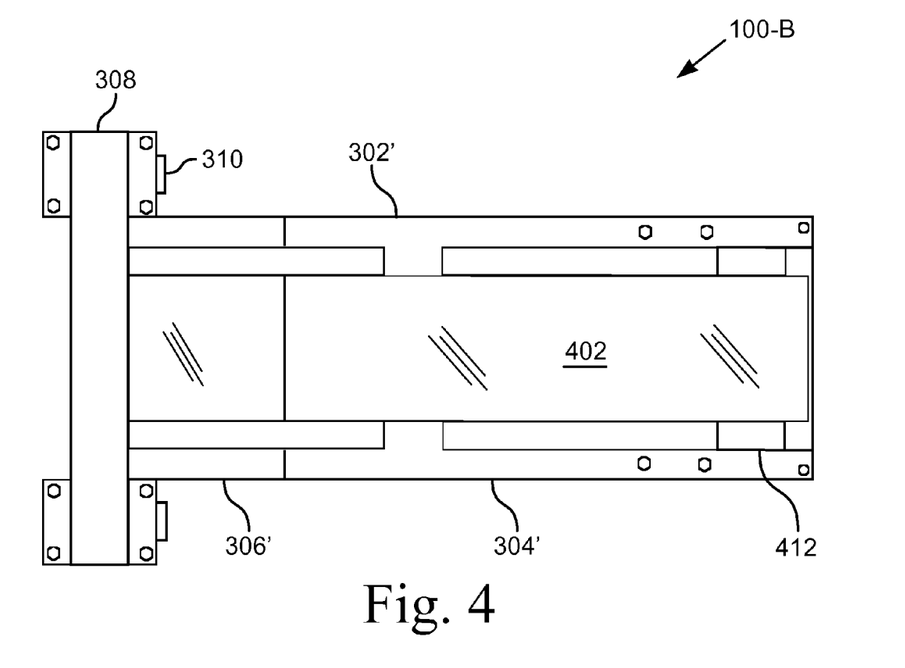
FIG. 4 is a top view of another embodiment of a carrier.
Figure 5:
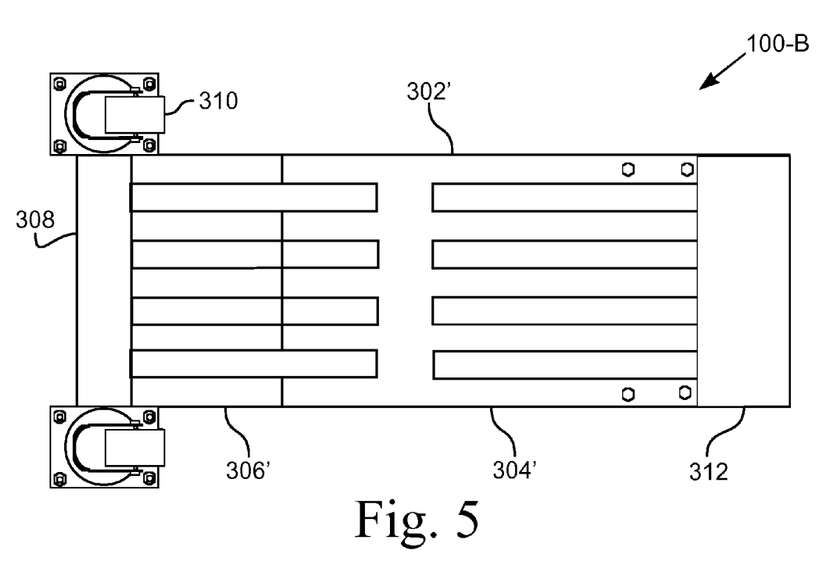
FIG. 5 is a bottom view of the embodiment displayed in FIG. 4.
Figure 6:
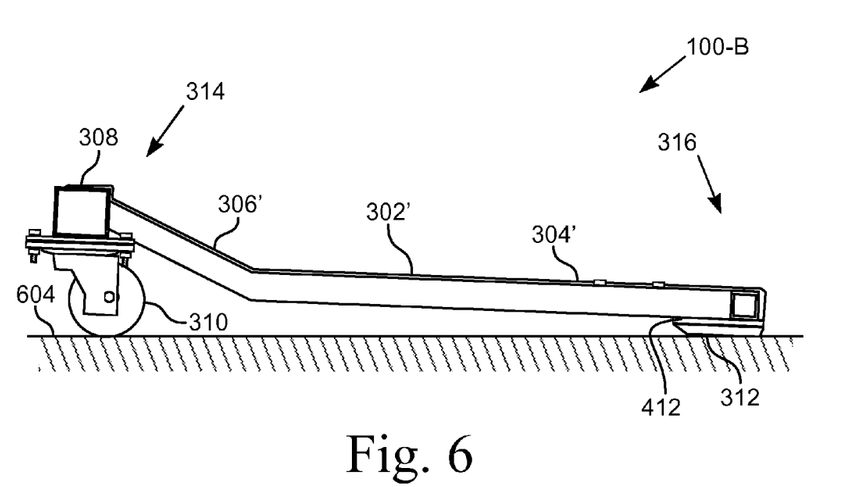
FIG. 6 is a side view of the embodiment of the carrier displayed in FIG. 4.

FIGS. 4, 5, and 6 illustrate another embodiment of the slide carrier 100-B in detail. The illustrated embodiment of the carrier 100-B includes a steel frame as a platform 302'. The frame is formed from sections of steel tube joined to form a rigid platform 302' that is lightweight, yet sufficiently strong to support the tire 108 of the dinghy 104 without deforming or flexing.

Affixed to the top of the carrier 100-B is a rough, high-friction nonskid surface 402, similar to a non-skid surface used on outdoor steps or boat decks. The non-skid surface 402, in one embodiment, is a metal grate, such as used on catwalks, or any other material that provides high friction to fix the tire 108 in position on the platform 302 and cause the tire 108 to turn in tandem with the carrier. A chock 306' in the form of an upward sweep of the frame 302' is located near the leading edge 314 of the carrier 100-B. The drag mechanism 312 of the carrier 100-B includes a pair of rolling caster wheels 310 that are affixed to the ends of a bar 308 that extend past the main body of the frame 302', thereby increasing the lateral stability of the carrier 100-B. The rolling caster wheels 310' present very little translational resistance to axial or lateral motion, and, therefore, the leading end 314 of the slide carrier 100-B is free to swing and translate in any horizontal direction.

Proximate the trailing end 316 of the carrier 100-B is a ceramic slide plate 312 that is fixed to a recessed tray 412 that in turn is bolted to the frame 302'. The plate 312 is relatively thin in order to allow the carrier 100-B to be close to the ground so that a dinghy wheel 108 may easily load onto the carrier 100-B. The plate 312 has a leading edge that is beveled or non-square. The beveled edge aids in the plate 312 sliding on the road surface 604. In the illustrated embodiment the caster wheels 312 are at a height relative to plate 312 such that the carrier frame 302' slopes slightly upward from the trailing end 316 to the leading end 314. In another embodiment the carrier frame 302' is substantially flat or level with the ground surface 604. The slide carrier frame 302' is positioned very close to the road surface 604 for stability.

The engineered ceramic plate 312 is made of alumina (aluminum oxide). The plate 312 has a hardness that is greater than the hardness of the abrasion-resisting component of a conventional road surface. Such a plate 312 slides over a typical road surface 604 such as concrete or asphalt, which is comprised essentially of silicon dioxide (e.g., quartz or sand) in a bound condition. For example, one type of alumina engineered ceramic has a hardness range between 12-14 gigapascals (GPa) when measured by the Vickers hardness test, whereas the abrasion-resisting material of asphalt and concrete, silicon dioxide, typically has a hardness of 10 GPa. In one test, a plate 312 with an absolute hardness of approximately 400 was determined to work. In other embodiments the engineered ceramic plate 312 is made of zirconia (zirconium oxide) and/or other similar mineral ceramic with a hardness greater than the conventional road surface. The plate 312 has a Roughness average (Ra) surface finish of approximately 12-32 micro-inches. The static coefficient of friction of the plate 312 on a conventional silicon dioxide road is approximately 0.21, and drops slightly to approximately 0.19-0.20 dynamically.

The carrier 100 is configured to be used on conventional paved surfaces 604. Such surfaces include hard paved surfaces, for example, asphalt, concrete, and bituminous surface treatment (BST). Although possible, it is less desirable to use the carrier 100 on other surfaces. Roads with a top layer of gravel, sand, or dirt typically have a coefficient of friction between the road surface and the plate 312 that is too low or that would result in the casters 310 digging into the road and, thereby, not being able to roll smoothly and with less resistance than the plate 312. Roads of cobblestone or setts (paving stones) typically present a surface with irregularities that would typically prevent the smooth operation of the plate 312 and/or the casters 310.

Figure 7:
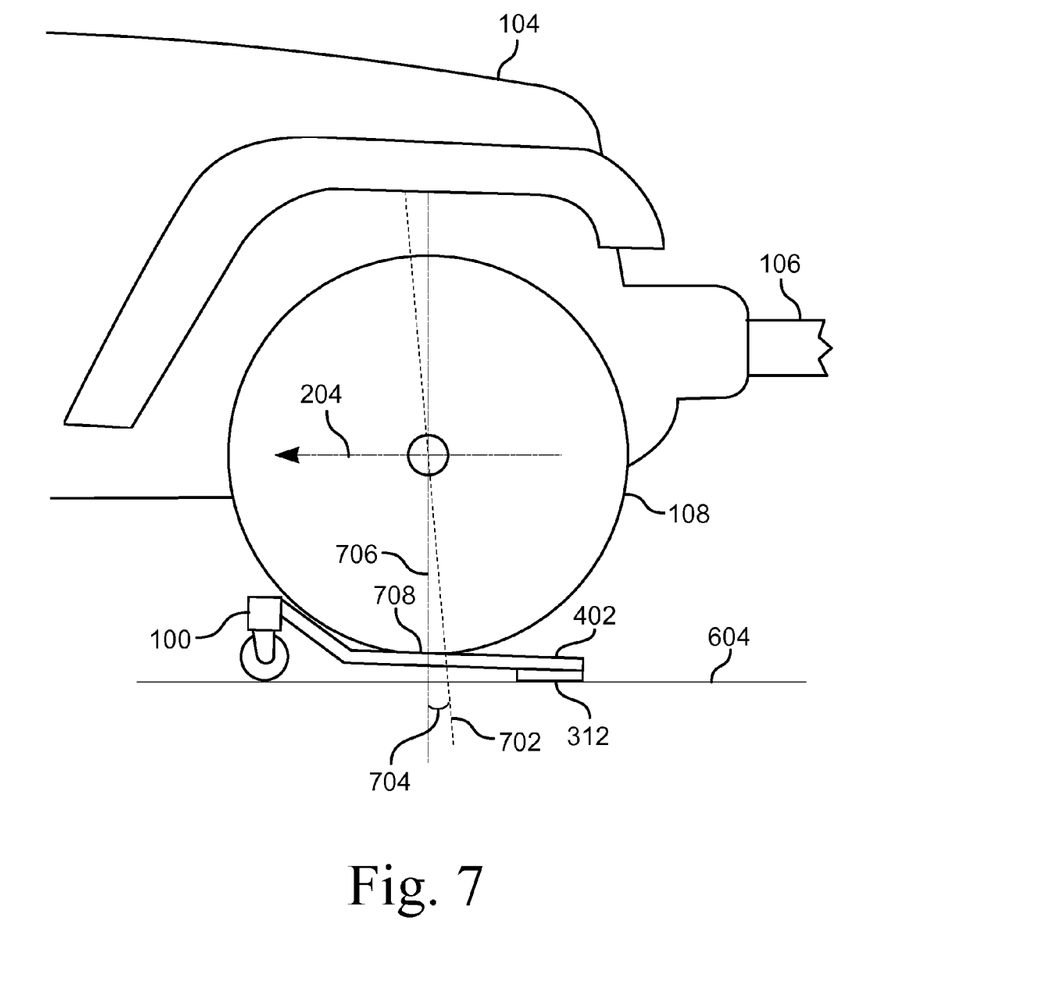
FIG. 7 is a side view of a carrier with a dinghy's right-side front wheel loaded onto the carrier.
Figure 8:
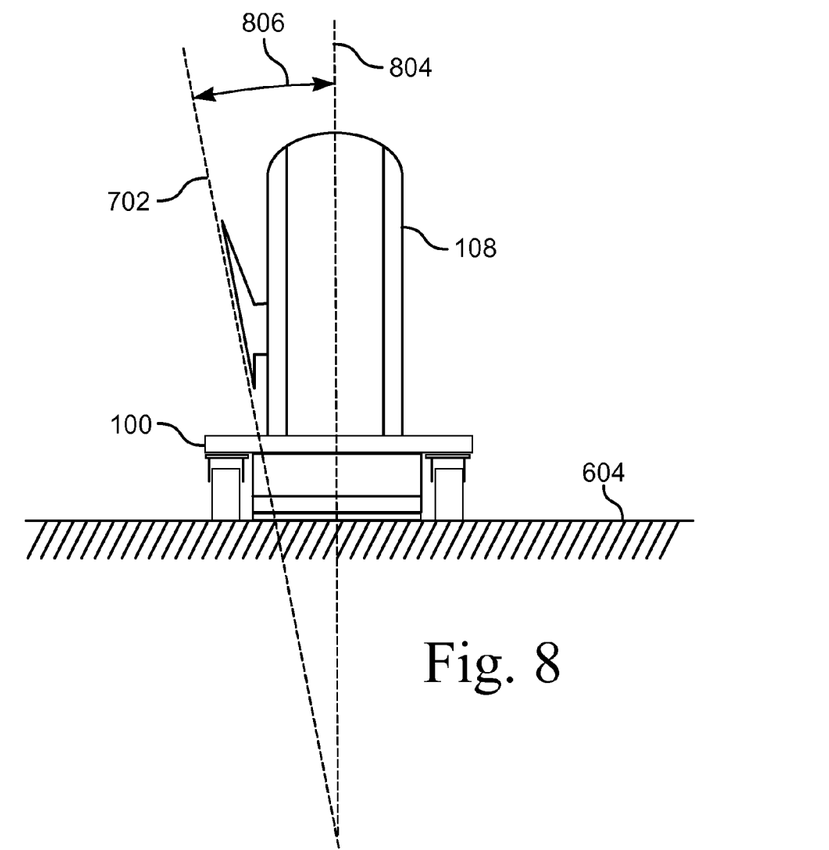
FIG. 8 is a view of a carrier with a dinghy's right-side front wheel loaded onto the carrier, as seen looking at the leading edge of the carrier from the rear of the dinghy.

FIGS. 7 and 8 illustrate the caster angle 704 and the steering axis inclination angle 806 of a dinghy front wheel 108. It is the caster angle 704 and the steering axis inclination angle 806 that cause the wheel 108 to make a maximum turn when the dinghy 108 is pushed in the reverse direction 204 from the front by a tow vehicle 102. As shown in FIGS. 7 and 8, the kingpin axis 702 is an imaginary pivot axis (originally a real piece of hardware in carriages and early automobiles) about which the front tire 108 rotates to turn the vehicle 104. In ordinary vehicles, the kingpin axis 702 is not perpendicular with the ground. FIGS. 7 and 8 illustrate, respectively, the caster angle 704 and the steering axis inclination angle 806 of the kingpin axis 702 on an conventional dinghy front wheel 108.

As seen in FIG. 7, the caster angle 704 is defined by the angle that the kingpin axis 702 deviates from a vertical line 706 that is parallel to the plane of rotation of the tire 108. The caster angle 704 has a slight tilt such that the top of the kingpin axis 702 angles rearward, usually in the range of 3 to 5 degrees. The projection of the kingpin axis 702 in the plane of rotation of the tire 108 is illustrated in FIG. 7. The caster angle 704 is a means of making a steering system tend to self-center when driving forward, and to preclude any tendency of the steering system to break into oscillation at higher speeds. The caster angle 704 is designed to project the kingpin axis 702 toward the front of the tire contact patch 708, which is the area where the tire 108 contacts the road surface 604, so that the contact friction of the contact patch exerts a rearward force to keep the tire 108 centered in straight-line travel.

As seen in FIG. 8, the steering axis inclination angle (SAI) 806 is defined by the angle that the kingpin axis 702 deviates from a vertical line 804 that is perpendicular to the plane of rotation of the tire 108, where the line 804 passes through the center of the tire 108. The steering axis inclination angle 806 is an inward angle of the kingpin at the top such that the kingpin axis 602 projects toward the center of the contact patch 606. The projection of the kingpin axis 702 in a plane perpendicular to the plane of rotation of the tire 108 is illustrated in FIG. 8. Since the kingpin axis 702 is inboard of the contact patch 708, the tire 108 is in its lowest energy position when the vehicle 104 is rolling forward in a straight line path. The steering axis inclination tends to slightly raise the vehicle when the front wheels 108 are steered in a turn. The downward weight of the vehicle 104 thus adds to the caster forces in tending to drive the vehicle 104 back to a straight line path. The caster angle 704 and steering axis inclination angle 806 combine to make the dinghy's steering system self-centering and stable at highway speeds. In FIG. 8 the tire 108 is resting on the carrier 100. The tire contact patch 708 is on the non-skid surface 402 and the tire 108 is disconnected from the road surface 604.

Figure 9:
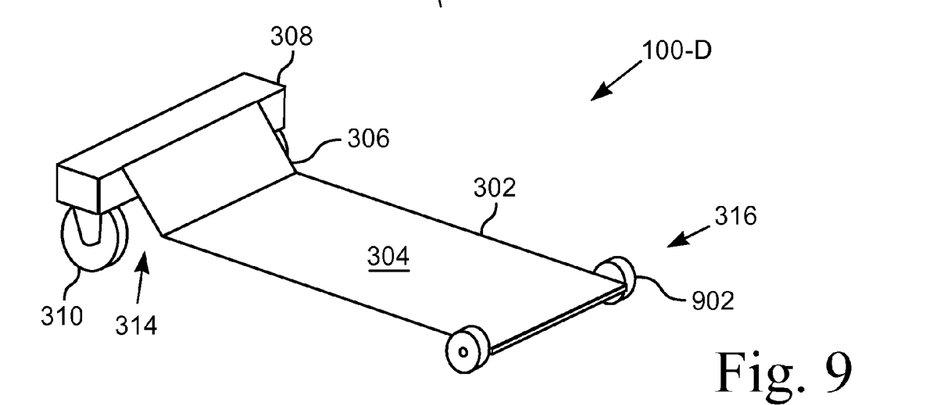
FIG. 9 is a perspective view of another embodiment of a carrier.

FIG. 9 illustrates a perspective view of another embodiment of a carrier 100-D. The carrier 100-D has a pair of rollers 902 as a drag mechanism. The rollers 902 are joined with an axle that passes under the platform 302. The rollers 902 have a drag clutch or other mechanism that increases the rolling resistance of the rollers 902. The rollers 902 have a rolling resistance, or drag, that is greater than the rolling resistance of the leading end wheels 310. In this way the trailing end 316 of the carrier 100-D has greater drag than the leading end 314, thereby overcoming the tendency of the dinghy front wheels 108 to turn counter to the reverse direction 204 when the dinghy 104 is backed up with the steering mechanism of the dinghy 104 unlocked and free-moving.

A method for using the carrier 100 will now be disclosed, as well as an explanation how the carrier 100 is able to overcome the natural tendency of a front wheel 108 to pivot on its kingpin axis 702 into a maximum turn as soon as the dinghy 104 is maneuvered backward.

When the need arises to back an RV 102 and dinghy 104, the driver positions two slide carriers 100 rearward of, and in contact with, the dinghy front steering tires 108. (From now on we will refer to just one of the two front steering wheels 108 and its respective carrier 100.) The driver proceeds to back up the RV and dinghy. When the RV 102 pushes the dinghy 104 rearward, the tire 108 rolls up on onto the slide carrier 100 that has been positioned behind it. The ceramic plate 312, in contact with the roadway 604, keeps the slide carrier 100 frictionally anchored in position so that the tire 108 continues to roll backward along the length of the slide carrier 100 until the tire 108 reaches approximately the mid-position of the carrier 100. The chock 318 arrests further motion of the tire 108 along the slide carrier 100. The load of the tire 108 is now distributed partly on the casters 310 toward the rear of the dinghy 104, and partly on the ceramic plate 312 that the dinghy 104 just passed over, toward the front of the dinghy 104.

The driver continues rearward motion 204 of the RV 102 and dinghy 104 as the tire 108 encounters the chock 318. As the rearward force against the chock 318 increases, vertical load downward increases on the casters 310 and decreases on the ceramic plate 312. Horizontal load increases on the ceramic plate 312 until the static coefficient of friction between the ceramic plate 312 and road surface 604 is overcome. The slide carrier 100 now begins translating on the roadway, rolling on the casters 310 and sliding on the ceramic plate 312. There is minimal friction at the caster or leading end 314 of the slide carrier 100, and frictional drag at the ceramic plate or trailing end 316. The slide carrier 100 beneath the steering tire 108 now carries half the front load of the dinghy 104, replacing the rolling function of the front tire 108. The front tire 108 remains rotationally stationary on the slide carrier 100. The frictional force of the ceramic plate 312 points toward the front of the dinghy 104.

FIG. 2 illustrates the carrier 100 controlling the orientation of the dinghy front tires 108 as the RV 102 continues to be backed up in the reverse direction 204. Inevitably, there will be some rotation of the RV 102, either intentionally to begin a turn, or incidentally from small tail swing motions in the RV. The tail swing of the RV 102 will induce an even greater lateral motion in the nose of the dinghy 104 because of the additional length of the tow hitch 106.

As the tail swing during the reverse maneuvering begins moving the nose of the dinghy 104 sideways, the steering system attempts to rotate the wheel 108 on its kingpin axis 602 (which would normally rotate the wheel 108 to a complete turn position). The tire contact patch 708, resting on the support surface 304 of the carrier 100, is strongly locked to the carrier by static friction. The tire contact patch 708 is also situated behind the kingpin axis 702 because of the caster angle 704 designed into the steering system, and therefore develops a turning moment in the slide carrier 100. However, as shown in FIG. 7, the slide plate 312 is positioned behind the kingpin axis 702 as it projects to the road surface 604. Thus, when the slide plate 312 generates an opposite turning moment, its moment is greater than the caster turning moment. The rolling caster wheels 310 on the slide carrier 100 provide minimal lateral resistance, thereby allowing the moment created by the plate 312 to govern the steering angle of the front tires 108 of the dinghy 104, thus keeping the tires 108 pointed in the direction of motion 204 induced by the RV 102.

The ceramic plate 312 acts, in effect, like a drag anchor in a boat, keeping the tires 108 pointed in, or parallel to, the direction of travel 204. The two slide carriers 100 together thereby develop a combined moment that prevents the dinghy 104 steering mechanism from rotating uncontrollably. Instead, the slide carriers 100 and wheels 108 tend to track the motion of the front end of the dinghy 104, generating minimal stresses. This protects the dinghy steering system, the tow hitch 106, and the RV 102 from the stresses of sudden impact of uncontrolled rotation. In essence, the dinghy 104 now behaves like a simple trailer, where the rear dinghy wheels are the trailer wheels, and the front wheels 108 are resting on the slide carriers 100, which are together carrying the front weight of the vehicle 104. In a single-axle trailer, this front weight would be carried by the trailer hitch, but in a flat-tow hitch, the front weight of the dinghy 104 is carried by the front tires 108. The RV 102 experiences no vertical load, only translational load. With the carriers 100 in place, the dinghy front weight is transferred through the front tires 108 and onto the sets of wheels 310 and the carrier plates 312. The RV driver can back up the RV 102 and dinghy 104 together as if backing up a trailer, obviating the need for uncoupling the dinghy 104 from the RV 102. The dinghy 104 can be made to travel in a straight line in the reverse direction 204, or in any radius of travel within the normal freedom allowed by the tow hitch 106. The dinghy 104 can be steered in the reverse direction 204 from the driver's seat in the RV 102 to negotiate a turn in the same manner as a conventional trailer. When backing up is completed, the driver shifts into forward and moves the vehicles 102, 104 forward approximately two feet until the dinghy tires 108 have driven off the slide carriers 100. The driver feels this event as a slight push forward. In moving forward, the ceramic plates 312 again serve as a lock on the road surface 604 to keep the slide carriers 100 in position while driving off of them. The slide carriers 100 are stowed, and the still-connected RV 102 and dinghy 104 can be driven away.

The alumina engineered ceramic plate 312 experiences surprisingly little frictional heating or degrading during use despite sliding under a relatively heavy load on concrete or asphalt. For example, in 115 feet of travel at a rate of 1.5 feet/second, and carrying half a forward dinghy weight of 2500 pounds, the temperature rise in the ceramic plate was barely perceptible to the touch. The minimal temperature increase is attributable to the plate surface being in contact with constantly new, ambient-temperature road surface 604 while sliding, as well as the relatively low coefficient of friction. Moreover, even after 500 feet of driving, the plate 312 shows virtually no degradation. The typical RV 102 would most likely not have to back more than 125 feet to egress a difficult situation, and even 125 feet is not expected to be a common occurrence.

The slide plate's 312 surprisingly low friction coefficient with hard road surfaces also lessens the force requirement to maneuver a dinghy 104 backwards. When using carriers 100 on both front wheels of a 4500-pound dinghy, a tow bar 106 requires approximately 500 pounds of driving force to push the dinghy 104 on a level surface, which is well within the safe loads of a typical tow bar 106 for flat towing. Driving power on a level road surface was measured at 1.5 horsepower, or 1.1 KW. It is this unexpected and favorable interaction of the engineering ceramic 312 with the road surface 604 that adds greatly to the novelty of this embodiment.

The slide carrier 100 includes various functions. The function of creating a turning moment against the dinghy front wheel 108 when the dinghy 104 is being maneuvered in reverse from a tow hitch 106 is implemented, in one embodiment, by caster wheels 310 and ceramic plate 312. The free motion of the caster wheels 310 and the drag of the ceramic plate 312 creates a turning moment in the carrier 100 that counteracts the turning moment of the front wheel 108.

The function of creating a turning moment against the dinghy front wheel 108 when the dinghy is being maneuvered in the reverse direction 204 by a tow vehicle 102 is implemented, in one embodiment, by caster wheels 310 and friction wheels. The free motion of the caster wheels 310 and the higher rolling resistance of the friction wheels creates a turning moment in the carrier 100 that counteracts the turning moment of the front wheel 108.

The function of keeping a front dinghy wheel 108 in place on the carrier 100 during use is implemented, in one embodiment, by a non-skid surface 402 and an upward sweep of the frame 302 that creates a chock 306. As shown in FIG. 7, the wheel 108 when fully loaded onto the carrier 100 is in contact with the carrier 100 at both the tire contact patch 708 and at the chock 306.

The function of holding the carrier in place while the dinghy wheel 108 is driven on and off is implemented, in one embodiment, by ceramic plate 312, which has a static friction coefficient on a road surface 604 of approximately 0.21 and, therefore, the plate 312 stays in place when the wheel 108 begins to exert a downward load on the carrier frame 302.

From the foregoing description, it will be recognized by those skilled in the art that a carrier for reverse maneuvering a flat-towed dinghy has been provided. The carrier includes a platform supporting one of the front tires of the dinghy. The trailing end of the carrier presents a greater amount of drag to the ground than does the leading end of the carrier.

In this way the carrier allows the dinghy to move in reverse with the front tires tracking properly.

While the present inventions have been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concepts.

What is claimed is:

1. A pair of apparatus, each one for supporting a front tire of a towed vehicle, the pair enabling the towed vehicle to be pushed backwards, each one of said pair of apparatus comprising:
   a platform having a leading end and a trailing end, said platform dimensioned and configured to receive a front tire of a vehicle at said trailing end, and said platform dimensioned and configured to support the tire on an upper surface of said platform;
   a set of wheels attached to said platform proximate said leading end;
   a drag mechanism attached to said platform proximate said trailing end, said drag mechanism supporting said trailing end of said platform, and said drag mechanism presenting a greater resistance to horizontal movement than said set of wheels;
   wherein said drag mechanism includes at least one sliding plate of a ceramic material.

2. The pair of apparatus of claim 1 wherein each said set of wheels includes a pair of swivel casters.

3. The pair of apparatus of claim 1 wherein said at least one sliding plate of said ceramic material has a Vickers hardness of at least 12 GPa.

4. The pair of apparatus of claim 1 wherein said at least one sliding plate of said ceramic material has a roughness average (Ra) surface finish of approximately 12 to 32 micro-inches.

5. The pair of apparatus of claim 1 wherein each one of said platforms includes a non-skid surface on said upper surface of said platform.

6. An apparatus for supporting a corresponding one of a front tire of a towed vehicle, said apparatus being one of a pair, said apparatus comprising:
   a platform having a leading end and a trailing end, said platform having an upper surface and a lower surface;
   a pair of wheels attached to said leading end of said platform, said pair of wheels supporting said leading end of said platform above a ground surface;
   said platform having a first section configured to support the front tire of the towed vehicle, said platform having a second section defining a tire stop whereby said second section is configured to prevent the front tire from rolling past said leading end when the towed vehicle is pushed backwards with the front tire supported on said platform; and
   a drag mechanism attached to said platform proximate said trailing end, said drag mechanism providing vertical support to said trailing end of said platform, said drag mechanism presenting a greater resistance to horizontal movement on the ground surface than said pair of wheels;

whereby said trailing end is configured to receive the tire as the tire rolls onto said platform; and wherein said drag mechanism includes at least one sliding plate of a ceramic material.

7. The apparatus of claim 6 wherein said pair of wheels each include a swiveling mechanism.

8. The apparatus of claim 6 wherein said at least one sliding plate of said ceramic material has a Vickers hardness equal to or greater than 12 GPa.

9. The apparatus of claim 6 wherein said least one sliding plate of said ceramic material has a roughness average (Ra) surface finish of approximately 12 to 32 micro-inches.

10. The apparatus of claim 6 wherein said platform includes a non-skid surface on said upper surface of said platform.

11. A carrier for supporting a front tire of a flat-towed dinghy that is being maneuvered in a reverse direction by a tow vehicle connected to the front of the dingy, said carrier comprising:

a platform having a leading end and a trailing end, said platform having an upper surface configured to support the front tire, said platform configured to receive the front tire at said trailing end when the flat-towed dinghy is moved in a reverse direction;

a leading end support attached proximate to said leading end of said platform, said leading end support supporting said leading end of said platform above a ground surface;

a trailing end support attached proximate to said trailing end of said platform, said trailing end support configured to support said trailing end of said platform above the ground surface, said trailing end support having a greater coefficient of friction to the ground surface than said leading end support; and said trailing end support includes at least one sliding plate of a ceramic material.

12. The carrier of claim 11 wherein said leading end support includes a pair of swivel casters.

13. The carrier of claim 11 wherein said at least one sliding plate of a ceramic material has a Vickers hardness of at least 12 GPa and has a roughness average (Ra) surface finish of approximately 12 to 32 micro-inches.

\* \* \* \* \*